United States Patent
Jackman et al.

(10) Patent No.: US 8,700,507 B2
(45) Date of Patent: Apr. 15, 2014

(54) PAYER-BASED ACCOUNT PORTING TO PORTABLE VALUE DISTRIBUTION SYSTEMS AND METHODS

(75) Inventors: Richard Jackman, Collierville, TN (US); Mark Herrington, Memphis, TN (US); Mark V. Putman, Memphis, TN (US)

(73) Assignee: Money Networks Financial, LLC, Cordova, TN (US)

( * ) Notice: Subject to any disclaimer, the term of this patent is extended or adjusted under 35 U.S.C. 154(b) by 245 days.

(21) Appl. No.: 11/834,457

(22) Filed: Aug. 6, 2007

(65) Prior Publication Data

US 2008/0215488 A1 Sep. 4, 2008

Related U.S. Application Data

(60) Provisional application No. 60/821,485, filed on Aug. 4, 2006.

(51) Int. Cl.
G06Q 40/00 (2012.01)
(52) U.S. Cl.
USPC .............................................. 705/35; 705/38
(58) Field of Classification Search
CPC ..................................................... G06Q 40/00
USPC ...................................................... 705/35, 40
See application file for complete search history.

(56) References Cited

U.S. PATENT DOCUMENTS

| | | | |
|---|---|---|---|
| 4,256,955 A | 3/1981 | Giraud et al. | |
| 4,321,672 A | 3/1982 | Braun et al. | |
| 4,385,285 A | 5/1983 | Horst et al. | |
| 4,700,055 A | 10/1987 | Kashkashian, Jr. | |
| 4,837,422 A | 6/1989 | Dethloff et al. | |
| 4,900,903 A | 2/1990 | Wright et al. | |
| 5,023,782 A | 6/1991 | Lutz et al. | |
| 5,155,342 A | 10/1992 | Urano | |
| 5,231,569 A | 7/1993 | Myatt et al. | |
| 5,483,445 A | 1/1996 | Pickering | |

(Continued)

FOREIGN PATENT DOCUMENTS

| | | |
|---|---|---|
| EP | 0 540 234 A2 | 5/1993 |
| EP | 0 725 376 A2 | 8/1996 |
| WO | WO 97/43893 A1 | 11/1997 |
| WO | WO 2005/106742 A2 | 11/2005 |

OTHER PUBLICATIONS

"Terms & Conditions of the AIR MILES® Reward Program," Air Miles Service Center, 1 page, May 1998.

(Continued)

*Primary Examiner* — Bruce I Ebersman
*Assistant Examiner* — John Anderson
(74) *Attorney, Agent, or Firm* — Kilpatrick Townsend & Stockton LLP

(57) ABSTRACT

A value distribution method includes enrolling a payee into a source program through which the payee receives funds from a payer. The source program includes a stored value account into which the payer deposits the payee's funds. The stored value account has account information associated therewith. The method also includes receiving a porting trigger, and, in response to the porting trigger, establishing a target program for the payee. The target program includes a target account into which entities in addition to the payer may deposit funds. The method also includes porting at least a portion of the account information from the source program to the target program.

13 Claims, 2 Drawing Sheets

(56) References Cited

U.S. PATENT DOCUMENTS

| | | |
|---|---|---|
| 5,500,513 A | 3/1996 | Langhans et al. |
| 5,513,102 A | 4/1996 | Auriemma |
| 5,537,314 A | 7/1996 | Kanter |
| 5,590,038 A | 12/1996 | Pitroda |
| 5,613,012 A | 3/1997 | Hoffman et al. |
| 5,614,703 A | 3/1997 | Martin et al. |
| 5,621,640 A | 4/1997 | Burke |
| 5,649,117 A | 7/1997 | Landry |
| 5,684,965 A | 11/1997 | Pickering |
| 5,770,843 A | 6/1998 | Rose et al. |
| 5,777,305 A | 7/1998 | Smith et al. |
| 5,826,243 A | 10/1998 | Musmanno et al. |
| 5,859,419 A | 1/1999 | Wynn |
| 5,863,073 A | 1/1999 | Taskett |
| 5,864,830 A | 1/1999 | Armetta et al. |
| 5,873,072 A | 2/1999 | Kight et al. |
| 5,914,472 A | 6/1999 | Foladare et al. |
| 5,920,847 A | 7/1999 | Kolling et al. |
| 5,943,656 A | 8/1999 | Crooks et al. |
| 5,953,710 A | 9/1999 | Fleming |
| 5,970,480 A | 10/1999 | Kalina |
| 5,978,780 A | 11/1999 | Watson |
| 5,999,596 A | 12/1999 | Walker et al. |
| 6,021,943 A | 2/2000 | Chastain |
| 6,029,150 A * | 2/2000 | Kravitz ........................... 705/39 |
| 6,044,360 A | 3/2000 | Picciallo |
| 6,049,782 A | 4/2000 | Gottesman et al. |
| 6,108,641 A | 8/2000 | Kenna et al. |
| 6,128,599 A | 10/2000 | Walker et al. |
| 6,128,602 A | 10/2000 | Northington et al. |
| 6,128,603 A | 10/2000 | Dent et al. |
| 6,226,623 B1 | 5/2001 | Schein et al. |
| 6,292,789 B1 | 9/2001 | Schutzer |
| 6,304,860 B1 | 10/2001 | Martin, Jr. et al. |
| 6,311,170 B1 | 10/2001 | Embrey |
| 6,327,577 B1 | 12/2001 | Garrison et al. |
| 6,422,462 B1 | 7/2002 | Cohen |
| 7,050,996 B1 | 5/2006 | Blagg et al. |
| 7,076,465 B1 | 7/2006 | Blagg et al. |
| 7,848,974 B1 * | 12/2010 | Sheehan ........................ 705/35 |
| 2002/0100797 A1 | 8/2002 | Hollingsworth et al. |
| 2002/0138424 A1 | 9/2002 | Coyle |
| 2002/0184148 A1 * | 12/2002 | Kahn et al. .................... 705/40 |
| 2002/0185855 A1 | 12/2002 | Klure |
| 2003/0004889 A1 | 1/2003 | Fiala et al. |
| 2004/0111361 A1 * | 6/2004 | Griffiths et al. ................ 705/39 |
| 2005/0082364 A1 | 4/2005 | Alvarez et al. |
| 2005/0086168 A1 | 4/2005 | Alvarez et al. |
| 2005/0109836 A1 * | 5/2005 | Ben-Aissa ..................... 235/380 |
| 2005/0199705 A1 | 9/2005 | Beck et al. |
| 2008/0040265 A1 * | 2/2008 | Rackley, III et al. ........... 705/40 |

OTHER PUBLICATIONS

White, Ron, "How Computers Work," Fourth Edition, 38 pages, Sep. 1998.

PCT International Search Report and Written Opinion mailed Aug. 25, 2008, International Application No. PCT/US07/75290, 11 pages.

Japanese Patent Office, Official Action on Patent Application No. 2009-523081, mailed on Dec. 22, 2011, 7 pages.

* cited by examiner

PAYER-BASED ACCOUNT PORTING TO PORTABLE VALUE DISTRIBUTION SYSTEMS AND METHODS

CROSS-REFERENCES TO RELATED APPLICATIONS

This application is a non-provisional, and claims the benefit, of co-pending, commonly assigned U.S. Provisional Patent Application No. 60/821,485, filed Aug. 4, 2006, entitled "Employer-Based Account Porting To Portable Payroll Card Systems And Methods," the entirety of which is herein incorporated by reference for all purposes.

This application is related to the following, co-pending, commonly assigned U.S. Provisional Patent Application No. 60/942,612, filed Jun. 7, 2007, entitled "Payroll Receipt Using A Trustee Account Systems And Methods," the entirety of which is being incorporated herein by reference.

FIELD OF THE INVENTION

Embodiments of the invention related generally to value distribution systems. More specifically, embodiments of the invention relates to systems and methods for providing options by which payees may receive, and/or payers may distribute, value.

BACKGROUND OF THE INVENTION

Some estimates indicate that fifty-six million (56,000,000) workers in the U.S. do not have a traditional banking relationship. This fact is driving increasing numbers of employers to assist their "unbanked" employees to establish financial partnerships through stored-value cards and other means. Additional benefits for employers may include the reduction of time and expense in distributing and administering paper checks for employees.

While stored-value accounts and the associated presentation instruments (e.g., cards) provide employees with convenient access to funds in most cases, the utility of such solutions is limited. For example, while an employee may be able to make ATM withdrawals and PIN-based purchases, the employee may not be able to make "signature-based" purchases. Moreover, the stored-value account may not be able to receive funds from sources other than the employer who issued the card. Hence, enhanced solutions are possible.

BRIEF SUMMARY OF THE INVENTION

Embodiments of the present invention thus provide a value distribution method. The method includes enrolling a payee into a source program through which the payee receives funds from a payer. The source program includes a stored value account into which the payer deposits the payee's funds. The stored value account has account information associated therewith. The method also includes receiving a porting trigger, and, in response to the porting trigger, establishing a target program for the payee. The target program includes a target account into which entities in addition to the payer may deposit funds. The method also includes porting at least a portion of the account information from the source program to the target program.

In some embodiments, the payee is an employee of the payer and wherein the funds comprise payroll funds. The porting trigger may be an auto-port trigger based on account inactivity for a predetermined period of time. The porting trigger may be a payee-initiated trigger. The porting trigger may be a payer-initiated trigger. The payer-initiated trigger may be part of a multi-payee trigger request. Only the payer may be able to deposit into the source program. The source program may have a branded presentation instrument associated therewith. The source program and the target program may have a common account identifier. Porting may include a batch operation.

Other embodiments provide a value processing system. The system includes an enrollment process wherein a payer enrolls a payee into a source program in which the payee receives funds from the payer through a source account having an account structure which may include a stored value account, in which the payee receives a non-personalized, instant issue presentation instrument which limits the payee to PIN-based transactions, or a branded stored value account, in which the payee receives a personalized presentation instrument which allows the payee to make at least some signature-based transactions. The system also includes a distribution process that provides the payer the ability to fund the account and which provides the payee the ability to access the payroll funds. The system also includes a porting process through which the source program is convertible into a target program. The target program has a target account having an account structure capable of receiving deposits from any of a plurality of deposit entities.

In some embodiments, the payee is an employee of the payer and wherein the finds comprise payroll. The porting process may include a payee-initiated trigger, a payer-initiated trigger or an auto-trigger. An auto-port trigger is based on account inactivity for a predetermined period of time. The source program may include a stored value account that limits depositors to only the payer. The target program may include a direct deposit account having an account number and a routing number associated therewith. The porting process may include associating account information from the source program to the target program. The distribution system may provide for the payer to fund the account via a web interface in both the source program and the target program.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
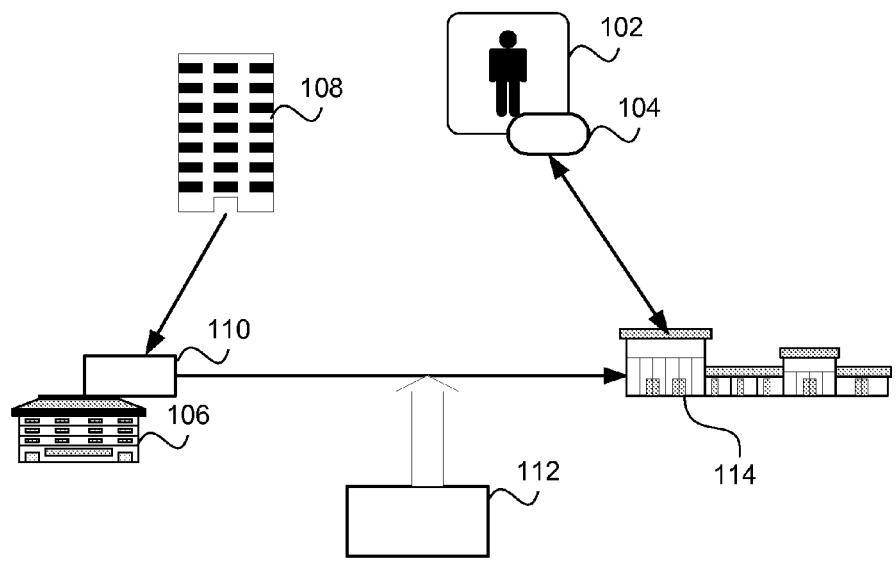
FIGS. 1A and 1B illustrate before and after porting scenarios, respectively.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following systems, methods, or software.

Embodiments of the invention relate to systems and methods for "porting" (i.e., converting, transferring, or the like) a particular value distribution program to a different value distribution program. Specific embodiments of the invention relate to porting from an employer-based payroll distribution program (source program) to a portable payroll program (target program), which gives the employee greater flexibility in using the program to receive wages or other value from a variety of sources. Although "employer" and "employee" will be uses herein to describe specific embodiments of value distribution programs relating to payroll, those skilled in the art will appreciate that those terms should be read broadly to include any payer or payee respectively receiving value other than payroll.

A source program typically is based on a stored value account (SVA). According to other embodiments, however, it is not required for an account to be associated with a source program. Hence, although reference will be made herein to an "account" associated with a program, which may be a target program or a source program, the term should be read broadly to include, for example, an account balance maintained on a platform. The source program typically provides only limited access to funds. For example, an employee may be limited to withdrawing funds at automated teller machines (ATMs) or may be limited to Personal Identification Number-based (PIN-based) transactions with merchants, although some SVA accounts (e.g., "branded" accounts) allow signature-based purchases, over-the-counter (OTC) bank withdrawals, and the like. As is known, funds typically are accessed using a presentation instrument, such as a magnetic stripe card. Herein, however, the terms "presentation instrument" and "card" will be understood to include all forms by which an account holder (e.g., employee) may access stored funds, including, without limitation e-wallets, cell phones, checks, account identifiers, and/or the like.

Target programs may be any of a variety of programs that are "portable" in the sense that they allow deposits to be received from entities other than the employer that initiated the program on behalf of the employee, a limitation found in other employer-based programs. A target program may be based on, for example, a demand deposit account (DDA), a general purpose stored value account, or the like, herein collectively "target account." According to embodiments of the present invention, the account holder (i.e., employee) after porting may receive deposits from other employers, make deposits personally, and the like. The employee also may enjoy other benefits unavailable prior to porting. For example, the employee may enjoy wider acceptance of the card for signature-based purchases at merchants; the employee may have more convenient access to account information via a web and/or telephone interface; the employee may be able to obtain secondary accounts for family members or others and fund those accounts with periodic transfers or web-initiated transfers from the prime account; and/or the like. Moreover, an employer that initiates a source program for an employee may retain certain benefits not otherwise available to other depositors once the source program is ported to a target program. For example, the employer may retain the ability to fund the account using a variety of funding methods not otherwise available to depositors. These deposit methods include web-based transfers, batch funding, payments made under the rules of NACHA and the ABA network, and/or the like. Many other advantages are provided by embodiments of the present invention.

According to embodiments of the present invention, porting may take place within the universe of a processing platform operated by a processor. Payroll service, however, may be provided by a third party operating within that universe (herein, payroll service provider). The payroll service provider may maintain independent relationships with issuers of source programs and of target programs or may be an issuer itself. Complicating the process, however, is the reality that source programs, target programs, and the porting from source to target programs may all fall within the jurisdiction of rules, laws, and/or regulations created by, for example, the Federal Reserve and governing money transfers generally and payroll systems specifically. Hence, implementations of embodiments of the present invention may be affected by realities other than technology.

Having described a general framework within which embodiments of the present invention may be implemented, a discussion more directed toward specific embodiments follows. According to embodiments of the invention, an employer enrolls an employee into a source program. The source program may be based on a typical SVA, which may allow only PIN-based transactions. Such programs, however, have the advantage that the employer may provide the employee with a card immediately upon establishment of the account. Alternatively, the employer may enroll the employee into a SVA based on a branded card, which may allow the employee to make signature-based purchases wherever the card's brand is accepted. Additionally, the employee may be able to obtain OTC bank withdrawals at certain financial institutions. But the employer may not be able to provide the employee with a branded card immediately upon initiation, perhaps because the card must be personalized to allow signature-based transactions. Hence, a third alternative exists according to some embodiments: the employee may receive an immediate-issue SVA card upon enrollment but may thereafter receive a branded card, this option being predetermined by the employer or elected by the employee. Other possibilities exist, the common element being that the accounts upon which the source program is based allow deposits from only the employer that initiates the program, at least according to most embodiments.

Once the employee is enrolled into any of the aforementioned source programs, the account may be ported to a target program. Porting may be triggered by any of several events and for a variety of different reasons. For example, the employee may elect to port from a source program to a target program to thereby enjoy certain advantages of the target program not provided by the source program in which the employee presently resides. The employer that initiated the employee into the program may initiate porting, perhaps because the employee no longer receives wages from the employer. The payroll service provider or other authorized entity also may initiate porting of the employee, perhaps because the account associated with the source program has been inactive for a substantial period of time. For example, the payroll service provider may provide accounts associated with source programs free of charge to either employers or employees, provided the accounts are active. Following a sustained period of inactivity, however, the payroll service provider may desire to transition toward closing the account. Porting the card to a target program may be the first step in the account closure process. Thereafter, any account balance may be depleted through account maintenance fees, and the account closed once the balance reaches zero. Of course, such procedures may be spelled out in documents provided to the employee upon enrollment into a source program.

In any of the aforementioned cases, account porting may be initiated through any of a variety of interfaces (e.g., web interface, customer service representative, custom software application, and/or the like). Moreover, porting may be accomplished as an immediate process or porting requests may be accumulated over a period of time for batch operation. An employer, for example, may have access to a web interface through which the employee may instantly port a terminated employee. The web interface also may allow the submission of a porting file (e.g., tab- or comma-delimited file, or the like), which allows the employer to submit multiple employee accounts for porting simultaneously, which porting may take place as a batch operation. Many other possibilities exist.

Embodiments of the present invention also provide for auto-porting. Using any of a variety of software implementations (e.g., a rules-based engine), source accounts may be identified for auto porting. In a specific example, an account having remained inactive for a predetermined period of time (e.g., 90 days) may be identified for porting. This could be, as explained above, the first step in an effort to close an inactive account. Inactivity may be defined (e.g., in specific rules) to be any of a variety of conditions (e.g., no deposit for the predetermined period; no deposit or withdrawal for the predetermined period; etc.) and any of a variety of conditions may result in a restarting of the clock against which inactivity is measured. Once an auto-port trigger is determined to have occurred, the subject account is ported from the source program to a target program. Moreover, the target program to which an account is ported may be determined based on the triggering rule. The particular target program also may be selected based on the source program from which the account is being ported.

The process for porting, whether manual porting or auto-porting, may be table-driven or otherwise implemented through a modular software or hardware mechanism. A software table, for example, can be used to link any source program to any target program based upon how the porting was triggered or any of a variety of other factors. If new source programs, target programs, triggering mechanisms, interfaces, and/or the like are added, the table may be expanded to address the new programs or processes without driving a need to accomplish substantial reprogramming of other parts of the system architecture.

As stated previously, the source programs and target programs may operate within a larger processing universe. A payroll service provider may not have access to all portions of that universe. Or more importantly, a payroll service provider may wish to limit the ability of others within the processing universe to access its systems. Hence, the operator of a processing platform upon which embodiments of the invention operate may use organizational tables (Org Tables) or other software or hardware mechanisms to prevent unauthorized manipulation of accounts within the processing universe. A payroll service provider my cooperate with the processor to establish and populate the Org Table to thereby operate with some degree of autonomy within a processing environment it does not fully control and to prevent others from interfering with its efforts.

Particular details of target programs to which accounts are ported may be based on the source program and the method of porting. In some cases, for example, a new card is not issued. This may be the case, for example, if an employee was enrolled initially into a branded SVA source program or was transitioned to one shortly thereafter. The same branded card the employee received for the source program may be usable in the target program. As another example, an employee-initiated porting may result in a "card kit" (e.g., a welcome packet, having account access information, deposit slips, "How To" guides, privacy policies, terms and conditions, and/or the like) being sent to the employee. Using a routing number and account number provided in the kit, the employee is able to receive deposits from other than the originating employer. But the kit may not be sent when an account is auto-ported. Similarly, an auto-ported account may not have a web site user account created, while an employee-initiated porting may result in such. Many other examples exist.

According to embodiments of the invention, target programs may have the same account number as the source program. This is a convenience feature enabled by the payroll service provider maintaining various mechanisms to map accounts for processing purposes. From the employee's and the employer's perspectives, however, the ability to maintain the same account number after porting provides substantial advantages.

Target programs may share a number of advantageous features according to embodiments of the invention. For example, employees may receive deposits from employers other than the initiating employer or from others, even though the originating employer may retain the ability to deposit directly into the employee's account using a convenient web interface. Employees may be able to obtain secondary accounts and conveniently transfer funds into them from the employee's account, either through a web-based interface, CSR, or automatically according to a predetermined schedule, although the secondary card feature may not be available in all porting scenarios (e.g., auto-port). A payroll service provider also may obtain various reports that track numbers of employees porting accounts and from which source programs and to which target programs.

Figure 1B:
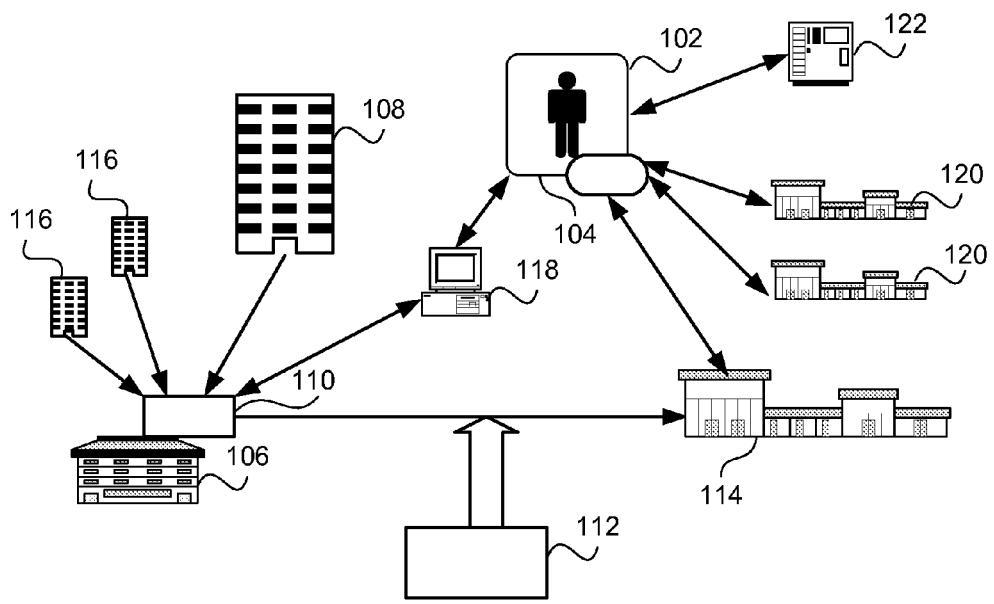

Having described embodiments of the present invention generally, attention is directed to FIGS. 1A and 1B which depict before-porting and after-porting diagrams, respectively. In FIG. 1A, an employee 102 is issued a presentation instrument 104 by a bank 106, or other suitable financial institution. The employee 102 works for an employer 108 who pays the employee 102 by depositing payroll funds in an account 110 of the employee 102 at the bank 106, which account 110 is accessible using the presentation instrument 104. A paycard provider 112 processes transactions by the employee 102 by paying merchants, financial institutions, and others 114 with whom the employee has transacted. This process is well known. Typically, however, the employer 108 is the only entity that can deposit funds to the account 110. Also, the employee 102 may be limited in the types of transactions that the employee 102 can accomplish using the presentation instrument 104. For example, the employee 102 may be limited to PIN-based transactions and ATM withdrawals.

Referring now to FIG. 1B, a post-porting situation will be described. In this situation, other depositors 116, which may be other employers, may deposit into the account 110. In fact, the employee 102 need no longer be employed by the employer 108. In addition, the employee 102 may be given electronic access to the account 110 via, for example, a web-enabled computer 118, cell phone, and/or the like. Moreover, the employee 102 can use the presentation instrument 104 to complete signature-based transactions in addition to PIN-based transactions. This allows the employee 102 to use the presentation instrument 104 with a number of different merchants 120 and at a wider variety of ATMs 122.

In a specific example of the embodiment of the present invention represented by FIGS. 1A and 1B, the employee 102, in the pre-porting situation of FIG. 1A, was issued a presentation instrument 104, which may be a card, a "chip," or the like, by his employer 108, which presentation instrument 104 was associated with a SVA account 110. The employee 102 could only make ATM withdrawals and PIN-based transactions at merchants 114 who accepted such payment. Only the employer 108 could deposit into the employee's 102 account 110. In the post-porting situation of FIG. 1B, however, the account 110 is ported from being a SSA into a DDA (or general purpose stored value account). Such porting may have been accomplished completely within the control of the paycard provider 112. In other words, the paycard provider 112 may either reconfigure the account 110 with the bank 106, or the paycard provider may simply create conversion tables that allow the same account 110 to be used post-porting. Because of the flexibility added by the paycard provider, the account functions as a DDA account (or general purpose stored value account), allowing wider acceptance for the employee/cardholder. In this specific example, the employee 102 is able to continue using the same presentation instrument 104 post-porting.

Figure 2:
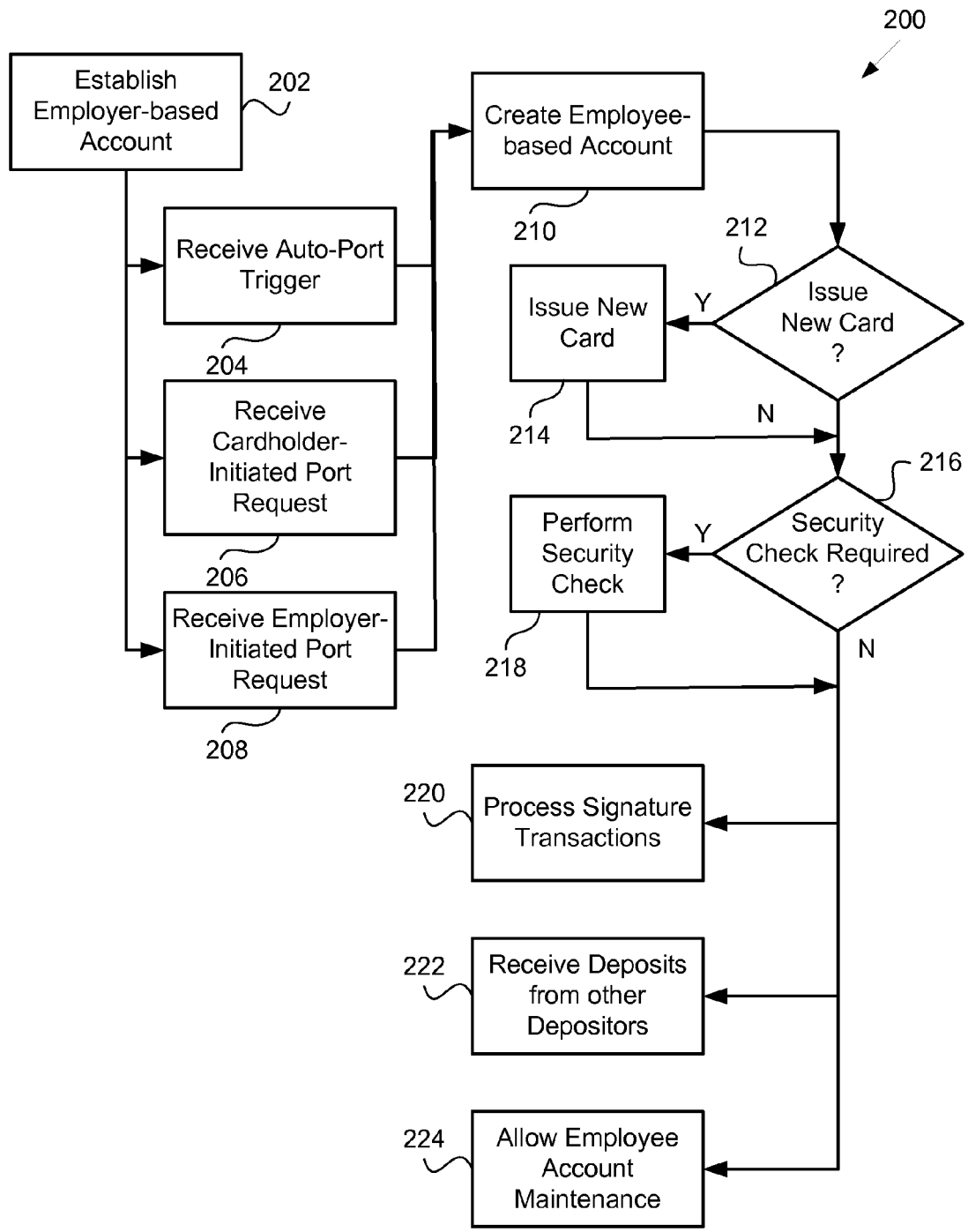
FIG. 2 depicts an account porting flow chart according to embodiments of the present invention.

Having described various aspects of the present invention, attention is directed to FIG. 2, which illustrates an exemplary method 200 according to embodiments of the invention. The method begins at block 202, at which point an employer-based payroll account is established for an employee/customer. In this exemplary embodiment, the account is a SVA, the employee can use the account only for ATM withdrawals, and only the employer of the employee can deposit into the account.

Thereafter, the account may be ported to a DDA account and the porting may be initiated in any of several ways. In a first way, represented by block 204, an auto-port trigger occurs. This may be, for example, an inactivity trigger in which no account activity has occurred in a preceding period of time (e.g., 90 days). This may evidence, for example, that the employee is no longer employed by the employer, in which case the account is no longer needed for its intended purpose.

In a second example, represented by block 206, the employee initiates the porting. This may be accomplished by the employee logging onto a particular web site, contacting a customer service representative, sending a form by mail or email, and/or the like.

In yet another example, represented by block 208, an employer-initiated port request is received. In this example, the employer may notify the paycard provider that the employee is no longer employed. Many such examples exist through which the porting of the account from a source program to a target program are possible.

Once a port request is received, via whatever means, the paycard provider, perhaps in coordination with the bank or financial institution at which the account resides, ports the account information from the source account to the target account. This is represented by block 210.

Account porting includes any or all of a variety of actions in various embodiments. In some embodiments, a program ID is changed at a transaction processing platform of other appropriate platform. The program ID determines, at least in part, how a transaction is processed, whether the transaction is a deposit transaction or a purchase transaction. The platform uses an account number, or other appropriate identifier, contained in an incoming transaction record to locate the program ID in a database. The transaction is thereafter processed accordingly.

In some embodiments, the new account may be the same account as the old account. In some embodiments, however, a new account is created, but lookup tables or other procedures are implemented to map old account information (e.g., account number, etc.) to the new account. Advantageously, the paycard provider may be able to accomplish all of this without assistance from a processor operating the processing platform upon which transactions using the card are processed.

Account porting also may include copying an account balance and/or transaction history to a new account, or otherwise associating this information with a new program ID. By doing so, from the employee/customer's perspective, the account has not changed. The employee may keep the same presentation instrument the employee used previously.

According to most embodiments, account porting does not require assigning a new ABA routing number to the account, although the capability does exist for assigning a new ABA routing number, changing the fee structure of the account, changing other account parameters that relate to how transactions associated with the account are handled, and/or the like. If applicable, the ABA routing number is provided to the employee/customer, in some embodiments without triggering the need to issue a new presentation instrument. The employee can then provide the ABA number to other employers, depositors, or payers so that the account can thereafter receive deposits from depositors other than the employee's employer.

In some embodiments, porting the account also includes issuing a new presentation instrument. Some or all of the information (e.g., the card number) may be different on the new presentation instrument. In some cases, the new presentation instrument may be branded differently than the prior presentation instrument. In other embodiments, however, the employee/customer continues to use the same presentation instrument as before, although enjoying the ability to accept deposits from other depositors without involving the financial institution at which the account resides.

At block 212, a decision is made whether the cardholder wants or requires a new presentation instrument. If so, the new presentation instrument is provided at block 214.

At block 216, a decision is made whether a security check is required. If so, the security check is performed at block 218. It should be appreciated that the security check decision may take place at any point in the process, including prior to the creation of the employee account at block 210. The security check may include obtaining certain information from the employee/cardholder that establishes the cardholder's identity.

The process continues at any of blocks 220, 222, 224. At block 220, the cardholder is able to use his presentation instrument to complete signature transactions, which benefit was previously unavailable to the cardholders. At block 222, other depositors are able to deposit funds into the cardholder's account. The additional depositors may or may not be employers. In fact, the cardholder no longer needs to be employed by his prior employer for other depositors to deposit into the account. Hence, the new account is portable for the cardholders. At block 224, the employee is able to initiate other account maintenance features on his own. This includes changing the billing address, account features, and the like. Many other such examples are possible.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

It should be noted that the methods, systems and devices discussed above are intended merely to be exemplary in nature. Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Also, it is worth noting that technology evolves, and that terms should be interpreted accordingly.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A value distribution method, comprising:
enrolling, by a computer system, a payee into a source program through which the payee receives funds from a payer, wherein:
the source program comprises a stored value account whose funding may be accessed using a branded card into which the payer deposits the payee's funds;
the payer enrolls the payee in the source program, wherein the payee is an account holder of the stored value account;
the source program permits only the payer to deposit funds to the stored value account; and
the stored value account has account information associated therewith and allows the payee to make signature-based purchases;
identifying, by the computer system, a predetermined period of inactivity of the stored value account;
in response to identifying the predetermined period of inactivity of the stored value account, generating, by the computer system, a porting trigger, wherein the porting trigger indicates that the source program that permits only the payer to deposit funds to the stored value account is to be converted to a target program that permits entities in addition to the payer to deposit funds, wherein the source program and the target program have a common account identifier;
establishing, by the computer system based on the porting trigger, the target program for the payee, wherein the target program comprises a target account into which entities in addition to the payer may deposit funds; and
porting, by the computer system, at least a portion of the account information from the source program to the target program such that funds from the target program may be accessed using the branded card.

2. The method of claim 1, wherein the payee is an employee of the payer and wherein the funds comprise payroll funds.

3. The method of claim 1, wherein porting at least the portion of the account information from the source program to the target program is table-driven.

4. The method of claim 1, wherein the porting trigger is triggered by the payee no longer receiving wages from the payer.

5. The method of claim 1, wherein porting comprises a batch operation.

6. The method of claim 1, further comprising: removing funds from the stored value account based on asserted maintenance fees; and closing the stored value account following a full depletion of funds, based on asserted maintenance fees, from the stored value account.

7. The method of claim 1, further comprising the predetermined period of inactivity of the stored value account stemming from discontinued receipt of wages by the payee from the payer.

8. A value processing system, comprising:
a computer-based enrollment process wherein:
a payer enrolls a payee into a source program in which the payee receives funds from the payer through a source account having an account structure comprising one of:
a stored value account, in which the payee is an account holder and receives a non-personalized, instant issue presentation instrument which limits the payee to PIN-based transactions; or
a branded stored value account, in which the payee is an account holder and receives a personalized presentation instrument which allows the payee to make at least some signature-based transactions; and the source program permits only the payer to deposit funds for the payee to the stored value account;

a computer-based distribution process that provides the payer the ability to fund the account and which provides the payee the ability to access the payroll funds; and a computer-based porting process through which the source program is convertible into a target program, wherein the source program and the target program have a common account identifier and, the porting process comprises triggers selected from one of the following: a payee-initiated trigger; a payer-initiated trigger; and an auto-trigger that is generated based on inactivity of one of the stored value account and the branded stored value account for a predetermined time period;

the target program has a target account having an account structure capable of receiving deposits from any of a plurality of deposit entities, such that the funds from the target program may be accessed using the instant issue presentation instrument or the personalized presentation instrument.

9. The value processing system of claim 8, wherein the payee is an employee of the payer and wherein the finds comprise payroll.

10. The value processing system of claim 8, wherein the target program comprises a direct deposit account having an account number and a routing number associated therewith.

11. The value processing system of claim 8, wherein the porting process includes associating account information from the source program to the target program.

12. The value processing system of claim 8, wherein the distribution system provides for the payer to fund the account via a web interface in both the source program and the target program.

13. A value distribution method, comprising:

enrolling, by a computer system, a payee into a source program through which the payee receives funds from a payer, wherein:

the source program comprises a stored value account whose funding may be accessed using a branded card into which the payer deposits the payee's funds;

the payer enrolls the payee in the source program, wherein the payee is an account holder of the stored value account;

the source program permits only the payer to deposit funds to the stored value account; and the stored value account has account information associated therewith and allows the payee to make one of signature-based purchases and PIN-based transactions;

identifying, by the computer system, a predetermined period of inactivity of the stored value account;

in response to identifying the predetermined period of inactivity of the stored value account, generating, by the computer system, a porting trigger, wherein the porting trigger indicates that the source program that permits only the payer to deposit funds to the stored value account is to be converted to a target program that permits entities in addition to the payer to deposit funds, wherein the source program and the target program have a common account identifier;

establishing, by the computer system based on the porting trigger, the target program for the payee, wherein the target program comprises a target account into which entities in addition to the payer may deposit funds; and porting, by the computer system, at least a portion of the account information from the source program to the target program such that funds from the target program may be accessed using the branded card.

\* \* \* \* \*